United States Patent [19]

Karasawa et al.

[11] 4,129,554

[45] Dec. 12, 1978

[54] THERMOSETTABLE, POLYMERIZABLE RESIN COMPOSITION COMPRISING A POLYEPOXIDE AND A POLYISOCYANATE STABILIZED BY INCORPORATING AN ORGANIC ELECTRON ACCEPTOR

[75] Inventors: Yoshiharu Karasawa; Tohru Koyama, both of Hitachi; Toshikazu Narahara, Naka, all of Japan

[73] Assignees: Hitachi Chemical Co., Ltd.; Hitachi, Ltd., both of Japan

[21] Appl. No.: 797,429

[22] Filed: May 16, 1977

[30] Foreign Application Priority Data

May 14, 1976 [JP] Japan .................................. 51-54340
Nov. 15, 1976 [JP] Japan ................................. 51-136328

[51] Int. Cl.$^2$ ............................................ C08L 63/00
[52] U.S. Cl. ...................................... 528/48; 252/182; 260/77.5 R; 528/53; 528/67; 528/73
[58] Field of Search ...... 260/47 EP, 47 EC, 77.5 AC, 260/77.5 R; 252/182

[56] References Cited

U.S. PATENT DOCUMENTS

| | | | |
|---|---|---|---|
| 3,020,262 | 2/1962 | Speranza | 260/47 EP |
| 3,494,888 | 2/1970 | McElroy | 260/47 EN |
| 4,022,721 | 5/1977 | Ashida | 260/77.5 AB |

*Primary Examiner*—M. J. Welsh
*Attorney, Agent, or Firm*—Craig & Antonelli

[57] ABSTRACT

A thermosettable, polymerizable resin composition comprising a polyepoxide and a polyisocyanate which is normally catalyzed by a basic curing catalyst for forming oxazolidone rings and isocyanurate rings or uredione rings is remarkably stabilized at low temperatures by incorporating a small amount of an organic electron acceptor, such as, picric acid, quinone, chloranil, or cyanoacetate ester into the composition. Since the specific electron acceptors effectively inhibit the polymerization of the reactive components in the composition at low temperatures, a shelf life of the composition is remarkably prolonged.

28 Claims, No Drawings

THERMOSETTABLE, POLYMERIZABLE RESIN COMPOSITION COMPRISING A POLYEPOXIDE AND A POLYISOCYANATE STABILIZED BY INCORPORATING AN ORGANIC ELECTRON ACCEPTOR

BACKGROUND OF THE INVENTION

The present invention is concerned with thermosettable, polymerizable resin compositions comprising polyepoxides and polyisocyanates, and more particularly with highly stabilized thermosettable, polymerizable resin compositions. Because of the stabilized characteristics of the composition, it has a remarkably prolonged shelf life or storage life around room temperature even in the presence of a basic curing catalyst for promoting the curing reaction of the composition. Further, the composition is highly stabilized so that the composition can be mixed with various additives such as filler powders, or so that the composition can be impregnated into fibrous materials such as glass cloth at slightly elevated temperatures without premature gelation of the composition.

Thermosettable, polymerizable compositions comprising polyepoxides and polyisocyanate are known as disclosed in German Offenlegungsschrift No. 2,359,386 and a U.S. Pat. No. 3,494,888. These compositions can produce cured products having excellent mechanical and electrical properties at high temperatures. The products exhibit excellent thermal stability or thermal resistance. For these reasons, the compositions are becoming used widely in the fields of, for instance, impregnation, casting and molding of electronic and electric devices.

The resin compositions are polymerized and cured by heating in the presence of a basic catalyst such as morpholine, imidazole or the like as disclosed in the German Offenlegungsschrift No. 2,359,386. The catalyst promotes the formation of oxazolidone rings formed by epoxy groups and isocyanate groups and of isocyanurate rings or uretdione rings formed by isocyanate groups.

When the composition contains the basic curing catalyst, it easily gels at low temperatures such as room temperature within a short period of time. Even if the composition contains no basic catalyst, it was found that insoluble substances precipitated from the composition within about 3 months at room temperature. Although the mechanism of the precipitation has not been elucidated, it is speculated that basic substances contained as impurities in the polyepoxide and polyisocyanate may have some influences on the precipitation.

On the other hand, when the composition containing no basic catalyst is heated to a slightly elevated temperature such as 50° C. so as to blend the components or to admix the components with additives such as fillers, the composition easily gels within about 2 to 3 weeks. The instability of the composition is a serious disadvantage when a large quantity of liquid composition is kept at slightly elevated temperatures in a tank so as to repeatedly use it for impregnation. The shortage of the stability of the composition free of the basic curing catalyst may be caused by the basic impurities. The instability is also observed when the liquid composition free of the basic curing catalyst is impregnated into fibrous insulatig materials to which the basic curing catalyst is added prior to impregnation.

U.S. Pat. No. 3,494,888 discloses thermosettable, polymerizable compositions comprising polyepoxide monomers or polymers and polyisocyanate polymers terminated by isocyanate groups and containing an isocyanurate ring or uretdione ring, or both. In preparing the polyisocyanate polymers, monomeric polyisocyanates are trimerized or dimerized in the presence of a basic catalyst. In order to obtain a desired polyisocyanate polymer terminated by free isocyanate groups, the trimerization or dimerization of the polyisocyanate is stopped by acidic substances such as acetic acid anhydride, toluenesulfonate, hydrogen chloride, phosphoric acid, chloroacetic acid, carboxylate chloride, carboxylic acids, mineral acids, etc.

According to the experimentation with respect to effects of the acidic substances disclosed in this U.S. patent on the stabilization of the composition, it was found that the acidic substances were not effective for the stabilization, while they may be useful as stoppers for the basic polymerization catalysts used in this U.S. patent.

SUMMARY OF THE INVENTION

Accordingly, it is an object of the present invention to provide thermosettable, polymerizable resin compositions comprising polyepoxides and polyisocyanates, which are substantially stabilized at low temperatures, but are rapidly cured when heated to high temperatures.

The present invention relates to the improvement in the stabilizing of a thermosettable, polymerizable resin composition comprising a polyepoxide and a polyisocyanate, which is normally catalyzed by a basic curing catalyst for forming in the cured product oxazolidone rings and isocyanurate rings or uretdione rings, or both. The improvement comprises incorporating into the composition a small amount of an organic electron acceptor selected from the group consisting of quinones and compounds having in the molecule one or more electron attractive groups selected from the group consisting of —CN, —NO$_2$, —COOR, —COR and —CHO, wherein R is a group selected from the group consisting of a lower alkyl group and an aryl group. By "lower alkyl group" it is meant a group containing from 1 to 8 carbon atoms and by "aryl group" it is meant an aromatic hydrocarbyl group containing 6 to 18 carbon atoms.

The amount of the electron acceptor to be incorporated into the composition is such that the polymerization reaction between the polyisocyanate and the polyepoxide is substantially inhibited at temperatures lower than about 60° C. The additive amount of the electron acceptor should not be excessively large, otherwise curing characteristics of the composition catalyzed by the basic curing catalysts may be deteriorated.

The present invention is applicable to both resin compositions in the fluid form and resin compositions in the powdered solid form that are polymerizable and curable to produce a continuous rigid thermoset resin.

The present invention is also applicable to compositions comprising polyepoxides and polyisocyanates which are free of basic curing catalysts and which are applied in advance to fibrous materials to be impregnated with the compositions, and to compositions containing the basic curing catalysts.

DETAILED DESCRIPTION OF THE INVENTION

1. Polyepoxide

By the word "polyepoxide" it is meant monomeric and polymeric polyepoxides having more than one epoxy group on the average in the molecule. The type of the epoxy group in the molecule is not critical, but a vicinal epoxy group is conventionally used and easily available.

Various polyepoxides have been known which include diepoxides such as a diglycidyl ether of bisphenol A, butadiene diepoxide, 3,4-epoxycyclohexylmethyl-(3,4-epoxy) cyclohexane-carboxylate, vinyl cyclohexene dioxide, 4,4'-di(1,2-epoxyethyl)-diphenyl ether, 4,4'-(1,2-epoxyethyl) biphenyl, 2,2-bis(3,4-epoxycyclohexyl) propane, a diglycidyl ether of resorcinol, a diglycidyl ether of phloroglucinol, a diglycidyl ether of methylphloroglucinol, bis(2,3-epoxycyclopentyl) ether, 2-(3,4-epoxy) cyclohexane-5,5-spiro(3,4-epoxy)-cyclohexane-m-dioxane and bis(3,4-epoxy-6-methylcyclohexyl)adipate, N,N'-m-phenylene-bis (4,5-epoxy-1,2-cyclohexanedicarboxyimide), and tri-and higher epoxides such as a triglycidyl ether of p-aminophenol, polyallylglycidyl ether, 1,3,5-tri(1,2-epoxyethyl) benzene, 2,2',4,4'-tetraglycidoxybenzophenone, tetraglycidoxytetraphenylethane, a polyglycidyl ether of phenol-formaldehyde novolac, a triglycidyl ether of glycerin and a triglycidyl ether of trimethylolpropane.

Among the foregoing polyepoxides, a polyglycidyl ether of phenol-formaldehyde novolac is especially preferred.

2. Polyisocyanate

By the term "polyisocyanate" it is meant monomeric and polymeric polyisocyanates containing more than one free isocyanate group on the average in the molecule. The polyisocyanates include diisocyanates such as methanediisocyanate, butane-1,1-diisocyanate, ethane-1,2-diisocyanate, butane-1,2-diisocyanate, trans-vinylene-diisocyanate, propane-1,3-diisocyanate, butane-1,4-diisocyanate, 2-butene-1,4-diisocyanate, 2-methylbutane-1,4-diisocyanate, pentane-1,5-diisocyanate, 2,2-dimethylpentane-1,5-diisocyanate, hexane-1,6-diisocyanate, heptane-1,7-diisocyanate, octane-1,8-diisocyanate, nonane-1,9-diisocyanate, decane-1,10-diisocyanate, dimethylsilane-diisocyanate, diphenylsilane-diisocyanate, ω,ω'-1,3-dimethylbenzene-diisocyanate, ω,ω'-1,4-dimethylbenzene-diisocyanate, ω,ω'-1,3-dimethylcyclohexane-diisocyanate, ω,ω'-1,4-dimethylcyclohexane-diisocyanate, ω,ω'-1,3-dimethylnaphthalene-diisocyanate, ω,ω'-1,4-dimethylnaphthalene-diisocyanate, ω,ω'-1,5-dimethylnaphthalene-diisocyanate, cyclohexane-1,3-diisocyanate, cyclohexane-1,4-diisocyanate, dicyclohexylmethane-4,4'-diisocyanate, 1,3-phenylene-diisocyanate, 1,4-phenylene-diisocyanate, 1-methylbenzene-2,4-diisocyanate, 1-methylbenzene-2,5-diisocyanate, 1-methylbenzene-2,6-diisocyanate, 1-methylbenzene-3,5-diisocyanate, diphenylether-4,4'-diisocyanate, naphthalene-1,4-diisocyanate, naphthalene-1,5-diisocyanate, biphenyl-4,4'-diisocyanate, 3,3'-dimethylbiphenyl-4,4'-diisocyanate, 2,3'-dimethoxybiphenyl-4,4'-diisocyanate, diphenylmethane-4,4'-diisocyanate, 3,3'-dimethoxydiphenyl methane-4,4'-diisocyanate, 4,4'-dimethoxydiphenylmethane-3,3'-diisocyanate, diphenylsulfide-4,4'-diisocyanate and diphenylsulfone-4,4'-diisocyanate, and tri- and higher isocyanates such as polymethylene-polyphenyl-isocyanate, triphenylmethane-triisocyanate, tris(4-phenyl isocyanatethiophosphate) and 3,3',4,4'-diphenylmethanetetraisocyanate.

Further, dimers and trimers of the foregoing polyisocyanates are useful. The dimers and trimers are terminated by free isocyanate groups and contain one or more isocyanurate ring or uretdione ring, or both. Methods of preparing various kinds of trimers and uretdiones are disclosed in U.S. Pat. No. 3,494,888; U.S. Pat. No. 3,108,100; and U.S. Pat. No. 2,977,370, etc.

Liquid polyisocyanates are also useful to obtain varnishes of the compositions. Among the liquid polyisocyanates preferable are mixtures of a polyisocyanate and carbodiimide polyisocyanates disclosed in German Offenlegungsschrift No. 2,601,927; Belgian patent No. 678,773; German Offenlegungsschrift No. 1,904,575; W. Neuman, P. Fischer: Angewandte Chemide, vol. 74, p. 803(1962); F. Kurzer, K. Douraghi-Zadahi: Chemical Review, vol. 67, pp. 110–120(1967); U.S. Pat. No. 3,657,161; U.S. Pat. No. 3,157,662; U.S. Pat. No. 2,491,983; U.S. Pat. No. 3,426,025; U.S. Pat. No. 3,406,198; etc. The carbodiimide polyisocyanates are represented by the general formula:

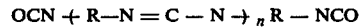

$$\text{OCN} + \text{R} - \text{N} = \text{C} - \text{N} \rightarrow {}_n\text{R} - \text{NCO}$$

wherein R is a residue of a polyisocyanate and n is an integer of not less than one, preferably one to four.

In general, crude polyisocyanates contain carbodiimide and hence are liquid at room temperature; such crude polyisocyanates are also useful for the present invention.

In the case of the compositions comprising the polyepoxide and the liquid polyisocyanate, the mixing ratio of the former to the latter is very wide, i.e. from more than 1 to about 40, preferably 1.5 to 30, while in the case of the composition comprising the polyepoxide and the solid polyisocyanate the mixing ratio is preferably within a range of more than 1 to 6, preferably 1.5 to 5.

The foregoing polyepoxides and polyisocyanates may be used singly or in the form of a mixture of two or more of them. If the amount of the polyisocyanate is smaller than 1 equivalent per equivalent of the polyepoxide, the heat resistance of the resulting cured product is poor, and if the amount of the polyisocyanate is larger than 40 equivalents per equivalent of the polyepoxide, the cured product becomes brittle.

3. Organic Electron Acceptor

The organic electron acceptors used in the present invention are classified into three groups, one of which is the type of compounds having an active methylene group, another of which is the type of compounds having an active methine group and the other is the type of π-type electron acceptors.

The compounds having an active methylene group represent the methylene group containing compounds that also contain at least an electron-withdrawing group adjacent to the methylene carbon, such as cyanoacetic acid, cyanoacetate methyl ester, cyanoacetate ethyl ester, cyanoacetate propyl ester, cyanoacetate butyl ester, α-cyanoacetamide, α-cyanoacetanilide, malononitrile, nitroacetic acid, nitroacetate methyl ester, nitroacetate ethyl ester, nitroacetate propyl ester, nitroacetate butyl ester, dinitromethane, nitroacetone, nitrochloromethane, formyl acetic acid, formyl acetate ethyl ester, formyl acetone, acetyl acetone, malonate dimethyl ester, malonate diethyl ester, malonate dipropyl ester, malonate dibutyl ester, acetoacetate methyl ester, acetoacetate ethyl ester, acetoacetate propyl ester, and acetoacetate butyl ester.

The compounds having an active methine group represent the methine containing compounds that also contain at least an electron-withdrawing group adjacent to the methine carbon, such as trinitromethane, tricyanomethane, 1,1-dicyanoethane, 1,1-dinitroethane, triacetoxymethane, α-dinitroacetate methyl ester, and α-nitropropionate ethyl ester.

The π-type electron acceptors are the aromatic compounds and unsaturated hydrocarbons fortified by electronwithdrawing groups, such as tetracyanoethylene, 7,7,8,8-tetracyanoquinonedimethane, 2,3-dichloro-5,6-dicyano-p-benzoquinone, tetrachloro-p-benzoquinone, tetrafluoro-p-benzoquinone, tetracyano-p-benzoquinone, 1,3,5-tricyanobenzene, 1,2,4,5-tetracyano-benzene, hexacyanobenzene, picric acid, picryl chloride, trinitrobenzoic acid, trinitrobenzoate methyl ester, trinitrobenzoate ethyl ester, trinitrobenzoate propyl ester, trinitrobenzoate butyl ester, trinitroanisole, 2,4,5,7-tetranitrofluorenone, 2,4,7-trinitrofluorenone, 1,3,6,8-tetranitrocarbozole, and quinones such as benzoquinone, and anthraquinone.

In the present invention, the π-type electron acceptors remarkably improve the storage stability of a composition of a polyepoxide and a polyisocyanate. The liquid resinous composition containing the π-type electron acceptors can be used repeatedly as an impregnation varnish with a sufficient margin for operation conditions. Even if the composition is heated to mix with a filler such as silica, alumina, glass powder or the like, the composition can be used for casting conveniently without a fear of premature gelation.

It is preferred that the amount of the electron acceptor be incorporated in an amount of $1 \times 10^{-5}$ to 5% by weight based on the total weight of the polyepoxide and polyisocyanate, while the effective amount may be varied in accordance with the required stability of the compositions, kinds of polyepoxides and polyisocyanates used, whether or not basic curing catalysts are contained in the compositions or other conditions. More preferably, the amount should be $1 \times 10^{-5}$ to 1% by weight. When the amount is less than $1 \times 10^{-5}$% by weight, no remarkable effect is expected, and if the amount is larger than 5% by weight, curing characteristics of the resulting compositions may be deteriorated.

4. Curing Catalyst

When the composition is heated in the presence of a basic catalyst which catalyzes polymerization and curing of the polyepoxide and polyisocyanate, there can be obtained a heat-resistant cured product excellent in the mechanical strength at high temperatures and in dielectric characteristics. The basic catalyst accelerates formation of hetero rings, namely, oxazolidone rings and isocyanurate rings or uretdione rings upon heating the composition.

In the German Offenlegungsschrift No. 2,359,386 there are disclosed various kinds of basic catalysts of forming hetero rings in the cured product obtained from the compositions.

Examples of the basic curing catalysts include tertiary amines such as trimethylamine, triethylamine, tetramethylbutanediamine and triethylenediamine, and other amines such as dimethylaminoethanol, dimethylaminopentanol, tris-(dimethylaminomethyl)phenol and N-methylmorpholine.

Further, there may be used quaternary ammonium salts such as cetyltrimethyl ammonium bromide, cetyltrimethyl ammonium chloride, dodecyltrimethyl ammonium iodide, trimethyldodecyl ammonium chloride, benzyldimethyltetradecyl ammonium chloride, benzyldimethylpalmityl ammonium chloride, allyldodecyltrimethyl ammonium bromide, benzyldimethylstearyl ammonium bromide, stearyltrimethyl ammonium chloride and benzyl dimethyltetradecyl ammonium acetylate. Still further, there may be employed imidazoles such as 2-methylimidazole, 2-ethylimidazole, 2-undecylimidazole, 2-heptadecylimidazole, 2-methyl-4-ethylimidazole, 1-butylimidazole, 1-propyl-2-methylimidazole, 1'-benzyl-2-methylimidazole, 1-cyanoethyl-2-methylimidazole, 1-cyanoethyl-2-undecylimidazole, 1-cyanoethyl-2-phenylimidazole, 1-(4,6-diamino-s-tryazinyl-2-ethyl)-2-methylimidazole, 1-(4,6-diamino-s-triazinyl-2-ethyl)-2-ethylimidazole and 1-(4,6-diamino-s-triazinyl-2-ethyl)-2-undecylimidazole.

In general, the basic catalyst, i.e. the hetero ring formation-promoting catalyst is added in an amount of 0.1 to 10% by weight based on the total weight of the polyepoxide and polyisocyanate. Curing of the resinous composition is accomplished by heating the composition in the presence of such catalyst at about 80° to about 250° C. for about 1 to about 50 hours.

The curing catalyst may be incorporated in a resinous composition stabilized by an organic electron acceptor when the resinous composition is used, or the catalyst may be applied to a material prior to impregnation, casting or coating with the composition.

The present invention will now be described in detail by reference to the following Examples, in which polyepoxides and polyisocyanates used are as follows:

Epoxy I: diglycidyl ether of bisphenol A having an epoxy equivalent of 174.

Epoxy II: novolac type polyglycidyl ether having an epoxy equivalent of 172.

MDI: 4,4'-diphenylmethane diisocyanate having an equivalent of 125.

Liquid MDI: a mixture of MDI and carbodiimide polyisocyanate obtained from MDI, which has an equivalent of about 140.

TDI: tolylene diisocyanate which is a mixture comprising 80% of a 2,4-isomer and 20% of 2,6-isomer, and has an equivalent of 87.

Further, in these Examples, by the "% by weight" is meant the amount of the corresponding component by weight based on the total weight of the polyepoxides and polyisocyanates.

EXAMPLES 1 TO 13

Polyepoxides, polyisocyanates and various electron acceptors having active methylene group or active methine group were combined as shown in Table 1 at mixing ratios also shown in Table 1. The resulting compositions were stored at 60° C. and the time (the number of days) required for the viscosity to increase to a level 10 times as high as the initial viscosity at 60° C. was measured as the shelf life to obtain results shown in Table 1.

Data of Referential Examples in which the shelf lives of comparative compositions free of an electron acceptor were similarly examined are also shown in Table 1.

Table 1

| Run No. | Polyepoxide (g) | Polyisocyanate (g) | Electron Acceptor (*% by weight) | Shelf Life (days) |
|---|---|---|---|---|
| (Referential Examples) | | | | |
| 1 | Epoxy I (100) | MDI (180) | not added | 20 |
| 2 | " | TDI (125) | " | 17 |
| 3 | Epoxy II (100) | MDI (180) | " | 15 |
| 4 | Epoxy I (100) | liquid MDI (200) | " | 13 |
| (Examples) | | | | |
| 1 | Epoxy I (100) | MDI (180) | methyl cyanoacetate (0.01) | >100 |
| 2 | " | TDI (125) | " (0.0124) | >100 |
| 3 | Epoxy II (100) | MDI (180) | " (0.01) | >100 |
| 4 | Epoxy I (100) | liquid MDI (200) | " (0.00933) | >100 |
| 5 | Epoxy I (100) | liquid MDI (200) | malononitrile (0.00933) | >100 |
| 6 | " | " | α-cyanoacetamide (0.00933) | >100 |
| 7 | " | " | acetylacetone (0.00933) | 31 |
| 8 | " | " | methyl acetoacetate (0.00933) | 40 |
| 9 | " | " | diethyl malonate (0.00933) | 41 |
| 10 | " | " | dimethyl maleonate (0.00933) | 24 |
| 11 | " | " | formyl acetate ethyl ester (0.00933) | >100 |
| 12 | " | " | trinitromethane (0.00933) | >100 |
| 13 | " | " | dinitromethane (0.00933) | 60 |

*based on the total weight of polyepoxide and polyisocyanate

As will be apparent from the data shown in Table 1, compositions of this invention have longer shelf lives than do the comparative compositions.

The composition of Example 1 shown in Table 1 was sufficiently mixed with 0.27 g of N-methylmorpholine, and the mixture was heat-treated at 110° C. for 5 hours, at 150° C. for 10 hours and then at 225° C. for 15 hours to obtain a cured product.

When the infrared absorption spectrum of the so obtained cured product was examined, it was found that a characteristic absorption band of the NCO group at a wave number of 2250 cm$^{-1}$ and a characteristic absorption band of the epoxy group at a wave number of 910 cm$^{-1}$ that were observed in the infrared absorption spectrum of the uncured composition, disappeared, but characteristic absorption band of carbonyl groups of the isocyanurate ring or uretdione ring and oxazolidone ring were observed at wave numbers of 1710 cm$^{-1}$ or 1770 cm$^{-1}$ and 1750$^{-1}$, respectively, as in the absorption spectrum of the cured product formed from the comparative composition free of an electron acceptor.

The cured products were found to have mechanical properties, thermal resistance characteristics and dielectric characteristics shown in Table 2, from which it will be apparent that these characteristics of the cured product formed from the composition of Example 1 are comparable to those of the cured product formed from the comparative composition free of methyl cyanoacetate.

Table 2

| Item | Example | Referential Example 1 |
|---|---|---|
| Mechanical Characteristics (as measured at 225° C.) | | |
| tensile strength (Kg/cm$^2$) | 450 | 449 |
| elongation (%) | 5.9 | 6 |
| after heating at 240° C. for 20 days: | | |
| tensile strength (Kg/cm$^2$) | 460 | 456 |
| elongation (%) | 3.9 | 4 |
| Weight Loss (%, heating at 240° C. for 20 days) | 3.6 | 3.6 |
| Dielectric Characteristics (as measured at 200° C.) | | |
| dielectric constant | 3.85 | 3.85 |
| dielectric dissipation(%) | 0.9 | 0.9 |
| volume resistivity (Ω . cm) | 3.1 × 10$^{12}$ | 3 × 10$^{12}$ |

EXAMPLE 14

A composition was prepared by mixing 100 g of Epoxy II, 200 g of liquid MDI and 2 g of acetylacetone. The shelf life of the composition as measured according to the method described in Example 1 was more than 100 days. The composition was mixed with 6 g of 1-cyanoethyl phenylimidazole and cured under the same conditions as described in Example 1. The cured product had a tensile strength of 430 Kg/cm$^2$ and an elongation of 3.7% as measured at 225° C. Further, dielectric characteristics of the cured product as measured at 200° C. were a dielectric constant of 3.8, a dielectric dissipation of 1.0% and a volume resistivity of 3.0 × 10$^{12}$ Ω . cm.

As will be apparent from the results of the foregoing Examples, an acidic compound having active methylene group or active methine group improves the storage stability of a composition comprising a polyepoxide and a polyisocyanate at elevated temperatures up to 60° C., and when it is incorporated in an amount within the above-mentioned range, it has no undesirable influences on characteristic properties of the cured resin.

EXAMPLES 15–34

Compositions comprising polyepoxides, polyisocyanates and π-type electron acceptors, compositions comprising polyepoxides, polyisocyanates and acidic compounds having active methylene group or active methine group and compositions comprising polyepoxides and polyisocyanates were prepared and shelf lives thereof were measured in the same manner as in Examples 1 to 14. The results are shown in Tables 3-(1), 3-(2) and 3-(3).

Table 3 - (1)

| Run No. | Polyepoxide (g) | Polyisocyanate (g) | π-Type Electron Acceptor(% by weight) | Shelf Life (days) |
|---|---|---|---|---|
| Example 15 | Epoxy I (100) | MDI (180) | picryl chloride (0.01) | >200 |
| Example 16 | " | liquid MDI (200) | " (0.00933) | >200 |
| Example 17 | " | TDI(125) | " (0.0124) | >200 |
| Example 18 | Epoxy II (100) | MDI(180) | " (0.01) | >200 |
| Referential Example 5 | Epoxy I (100) | MDI (180) | not added | 20 |
| Referential Example 6 | " | liquid MDI(200) | " | 13 |
| Referential Example 7 | " | TDI(125) | " | 17 |
| Referential Example 8 | Epoxy II (100) | MDI(180) | " | 15 |

Table 3 - (2)

| Run No. | Shelf Life (days) |
|---|---|
| π-Type Electron Acceptor (0.0000933% by weight) | |
| Example 19 picric acid | >150 |
| Example 20 picryl chloride | >150 |
| Example 21 tetracyanoethylene | 95 |
| Electron Acceptor having active methylene group (0.0000933% by weight) | |
| Example 22 methyl cyanoacetate | 30 |
| Example 23 α-cyanoacetamide | 26 |
| Example 24 malononitrile | 75 |

Note:
Resin Components: Epoxy I (100 g) and liquid MDI (200 g)

It is seen from Table 3-(2) that the π-type electron acceptors exhibit better stabilizing effects in a small amount than do the electron acceptors having an active methylene group.

Table 3 - (3)

| Example No. | π-Type Electron Acceptor (0.00933% by weight) | Shelf Life (days) |
|---|---|---|
| 25 | picric acid | >200 |
| 26 | 2, 4, 6-trinitrobenzene | >200 |
| 27 | 2, 4, 6-trinitroanisole | >200 |
| 28 | 2, 3-dichloro-5,6-dicyano-p-benzoquinone | 80 |
| 29 | 1, 3, 6, 8-tetranitrocarbazole | 60 |
| 30 | tetracyanoethylene (0.028% by weight) | 150 |
| 31 | 2, 4, 6-trinitrobenzene | 80 |
| 32 | m-nitrobenzaldehyde | 85 |
| 33 | chloranil | 105 |
| 34 | 2, 4, 7-trinitrofluorenone | 89 |

Note:
Resin Component: Epoxy I (100 g) and liquid MDI (200 g)

The composition of Example 15 shown in Table 3-(1) was sufficiently mixed with 0.27 g of N-methylmorpholine, and the mixture was heat-treated at 110° C. for 5 hours, at 150° C. for 10 hours and then at 225° C. for 15 hours to obtain a cured product.

When the infrared absorption spectrum of the so obtained cured product was examined, it was found that a characteristic absorption band of the NCO group at a wave number of 2250 cm$^{-1}$ and a characteristic absorption band of the epoxy group at a wave number of 910 cm$^{-1}$, which was observed in the infrared absorption spectrum of the uncured composition disappeared, but characteristic absorption bands of carbonyl groups of the isocyanurate ring or uretdione ring and oxazolidone ring were observed at wave numbers of 1710 cm$^{-1}$ or 1770 cm$^{-1}$ and 1750 cm$^{-1}$, respectively, as in the absorption spectrum of the cured product formed from the comparative composition free of an electron acceptor.

The cured products were found to have mechanical properties, thermal degradation characteristics and dielectric characteristics shown in Table 4, from which it will be apparent that these characteristics of the cured product formed from the composition of Example 15 are comparable to those of the cured product formed from the comparative composition free of an electron acceptor.

Table 4

| Item | Example 15 | Referential Example 5 |
|---|---|---|
| Mechanical Characteristics (as measured at 225° C.) | | |
| tensile strength (Kg/cm$^2$) | 450 | 449 |
| elongation (%) | 5.9 | 6 |
| after heating at 240° C. for 20 days | | |
| tensile strength (Kg/cm$^2$) | 458 | 456 |
| elongation (%) | 3.9 | 4 |
| Weight Loss (%, after heating at 240° C. for 20 days) | 3.6 | 3.6 |
| Dielectric Characteristics (as measured at 200° C.) | | |
| dielectric constant | 3.85 | 3.85 |
| dielectric dissipation (%) | 0.9 | 0.9 |
| volume resistivity (Ω . cm) | $3.1 \times 10^{12}$ | $3 \times 10^{12}$ |

EXAMPLE 35

A composition was prepared by mixing 100 g of Epoxy II, 200 g of liquid MDI and 2 g of tetracyanoethylene. The shelf life of the composition as measured according to the method described in Example 15 was more than 200 days. The composition was mixed with 6 g of 1-cyanoethyl-2-phenylimidazole and cured under the same conditions as described in Example 15. The cured product had a tensile strength of 440 Kg/cm$^2$ and an elongation of 3.9% as measured at 225° C. Further, dielectric characteristics of the cured product as measured at 200° C. were a dielectric constant of 3.9, a dielectric dissipation of 1.0% and a volume resistivity of $3.0 \times 10^{12}$ Ω . cm.

EXAMPLE 36

The shelf life of a composition comprising 100 g of Epoxy I, 200 g of liquid MDI and a picric acid in an amount indicated in Table 5 was determined in the same manner as described in Example 15. Then, 1 g of 1-cyanoethyl-2 phenylimidazole was added to the composition, and the mixture was sufficiently mixed and cured at 100° C. for 5 hours, at 150° C. for 10 hours and then at 225° C. for 15 hours. The tensile strength of the cured product was measured. Results are shown in Table 5.

Table 5

| Run No. | Amount of Picric Acid g | Amount of Picric Acid % by weight | Shelf Life (days) | Tensile Strength ($Kg/cm^2$) initial stage | Tensile Strength ($Kg/cm^2$) after heating at 225° C. for 45 days |
|---|---|---|---|---|---|
| 1 | $3 \times 10^{-5}$ | $1 \times 10^{-5}$ | 120 | 360 | 350 |
| 2 | $1.5 \times 10^{-3}$ | $5 \times 10^{-4}$ | >200 | 370 | 350 |
| 3 | $1.5 \times 10^{-2}$ | $5 \times 10^{-3}$ | >200 | 360 | 360 |
| 4 | 3 | 1 | >200 | 340 | 300 |
| 5 | 6 | 2 | >200 | 150 | 170 |

Note:
The tensile strength was measured at 225° C.

As will be apparent from the results of the foregoing Examples, a $\pi$-type electron acceptor improves the storage stability of a composition comprising a polyepoxide and a polyisocyanate, at temperatures of up to 60° C., and when it is incorporated in an amount within the above-mentioned range, it has no undesirable influences on characteristic properties of cured resin.

EXAMPLES 37-54 and REFERENTIAL EXAMPLES 9-11

Compositions containing electron acceptors shown in Table 6 and comparative compositions were prepared. Shelf lives of the compositions were measured on the same manner as in Examples 1-14.

Molar ratios of polyepoxides to polyisocyanate in Examples 38 and 39, Examples 40-44, Examples 45-49, and Examples 50-53 are 2.5, 10, 20 and 40, respectively. Molar ratios in Referential Example 9, Referential Example 10 and Referential Example 11 are 10, 20 and 40, respectively.

Table 6

| Example No. | Epoxy I (g) | Liquid MDI (g) | Electron Acceptor (% by weight) | | Shelf Life (days) |
|---|---|---|---|---|---|
| 38 | 100 | 200 | 2, 4, 6-trinitrobenzoate methyl ester | (0.0000933) | 150 |
| 39 | " | " | " | (0.00933) | >200 |
| 40 | " | 800 | cyanoacetatic acid | (0.00311) | >250 |
| 41 | " | " | cyanoacetate methyl ester | (0.00311) | >250 |
| 42 | " | " | malononitrile | (0.00311) | >250 |
| 43 | " | " | picrylchloride | (0.0000311) | >250 |
| 44 | " | " | picric acid | (0.0000311) | >250 |
| 45 | " | 1600 | cyanoacetic acid | (0.00165) | >250 |
| 46 | " | " | cyanoacetate methyl ester | (0.00165) | >250 |
| 47 | " | " | malononitrile | (0.00165) | >250 |
| 48 | " | " | picrylchloride | (0.0000165) | >250 |
| 49 | " | " | picric acid | (0.0000165) | >250 |
| 50 | " | 2400 | cyanoacetic acid | (0.00112) | >250 |
| 51 | " | " | malononitrile | (0.00112) | >250 |
| 52 | " | " | picrylchloride | (0.0000112) | >250 |
| 53 | " | " | picric acid | (0.0000112) | >250 |
| Referential Example | | | | | |
| 9 | " | 800 | not added | | 89 |
| 10 | " | 1600 | " | | 110 |
| 11 | " | 2400 | " | | 180 |

0.6 g of N-methylmorpholine was mixed with 100 g of each of the compositions of Examples 41, 42, 44, 46, 47 and 49 and 100 g of each of the compositions of Referential Examples 9 and 10. The resulting compositions were cured by heating to 110° C. for 5 hours, 150° C. for 10 hours and 225° C. for 15 hours.

Mechanical and electrical properties of the resulting cured products are shown in Table 7.

Table 7

| | Examples | | | | | | Referential Examples | |
|---|---|---|---|---|---|---|---|---|
| | 41 | 42 | 44 | 46 | 47 | 49 | 9 | 10 |
| Mechanical Properties (at 230° C.) Initial | | | | | | | | |
| Tensile strength ($Kg/cm^2$) | 518 | 510 | 521 | 478 | 479 | 481 | 520 | 480 |
| Elongation (%) | 3.1 | 3.2 | 3.1 | 3.2 | 3.3 | 3.2 | 3.2 | 3.3 |
| After Heat-Degradation (at 240° C. for 20 days) | | | | | | | | |
| Tensile strength ($Kg/cm^2$) | 382 | 381 | 379 | 378 | 374 | 377 | 380 | 375 |
| Elongation (%) | 1.5 | 1.4 | 1.6 | 1.3 | 1.4 | 1.4 | 1.5 | 1.4 |
| Weight Loss (at 240° C. for 20 days, %) | 2.3 | 2.3 | 2.3 | 1.8 | 1.8 | 1.8 | 2.3 | 1.8 |
| Dielectric Properties (at 200° C.) | | | | | | | | |
| Dielectric constant | 2.8 | 2.9 | 3.1 | 2.8 | 2.9 | 3.0 | 3.1 | 2.9 |
| Dielectric dissipation (%) | 0.5 | 0.5 | 0.5 | 0.4 | 0.3 | 0.4 | 0.5 | 0.3 |
| Volume resistivity ($\Omega \cdot cm$) | $1 \times 10^{14}$ | $1.5 \times 10^{14}$ | $1 \times 10^{14}$ | $9 \times 10^{15}$ | $1 \times 10^{14}$ | $8 \times 10^{15}$ | $1 \times 10^{14}$ | $8 \times 10^{15}$ |

Further, 0.6 g of 1-cyanoethyl-2-phenylimidazole was mixed with 100 g of each of the compositions of Examples 41 and 46 and 100 g of each of the compositions of Referential Examples 9 and 10. The resulting compositions were cured under the same conditions as mentioned above. Mechanical and electrical properties of the resulting cured products are shown in Table 8 below.

Table 8

| Mechanical Properties | Examples | | Referential Examples | |
|---|---|---|---|---|
| | 41 | 46 | 9 | 10 |
| Initial | | | | |
| Tensile strength (Kg/cm$^2$) | 520 | 481 | 520 | 480 |
| Elongation (%) | 3.0 | 3.2 | 3.1 | 3.3 |
| After Heat Degradation at 240° C. for 20 days | | | | |
| Tensile strength (Kg/cm$^2$) | 385 | 378 | 382 | 375 |
| Elongation (%) | 1.6 | 1.4 | 1.5 | 1.4 |
| Weight Loss (at 240° C. for 20 days, %) | 2.2 | 1.8 | 2.3 | 1.8 |
| Dielectric Properties (at 200° C.) | | | | |
| Dielectric constant | 2.8 | 2.9 | 2.9 | 2.9 |
| Dielectric dissipation (%) | 0.5 | 0.3 | 0.5 | 0.3 |
| Volume resistivity (Ω . cm) | $1\times10^{14}$ | $9\times10^{15}$ | $1\times10^{14}$ | $9\times10^{15}$ |

What is claimed is:

1. In the stabilizing of thermosettable, polymerizable compositions comprising polyepoxides having more than one epoxy group and polyisocyanates having more than one free-isocyanate group, on the average, which are normally catalyzed by a basic curing catalyst for forming in the cured product oxazolidone rings and isocyanurate rings or uretdione rings, or both, the improvement that comprises inhibiting at temperatures of about 60° C. or lower the polymerization of the reactive components in the compositions in the absence of the basic curing catalyst by incorporating into the compositions an electron acceptor selected from the group consisting of:
   (1) Compounds having an active methylene or methine group connected to an electron attractive group from the class consisting of group of —CN, —NO$_2$, —COOR, —COR, and —CHO, where R is a lower alkyl group having one to 8 carbon atoms; and
   (2) Compounds of $\pi$-type electron acceptor, wherein the amount of the electron acceptor is of $1 \times 10^{-5}$ to 1% by weight based on the total weight of the polyepoxides and polyisocyanates.

2. The improvement as defined in claim 1 wherein the equivalent ratio of polyepoxide to polyisocyanate in the composition is from more than 1 to about 40, respectively.

3. The improvement as defined in claim 1, wherein the electron acceptor is cyanoacetic acid, cyanoacetate lower alkyl esters, α-cyanoacetamide, α-cyanoacetanilide, malononitrile, nitroacetic acid, nitroacetate lower alkyl esters, dinitromethane, nitroacetone, nitrochloromethane, formyl acetic acid, formyl acetate lower alkyl esters, formyl acetone, acetyl acetone, malonate lower alkyl diesters, or acetoacetate lower alkyl esters.

4. The improvement as defined in claim 3, wherein the electron acceptor is malononitrile.

5. The improvement is defined in claim 3, wherein the electron acceptor is cyanoacetic acid.

6. The improvement as defined in claim 1, wherein the amount of the electron acceptor is of $1 \times 10^{-4}$ to 0.1% by weight.

7. The improvement as defined in claim 1, wherein the electron acceptor is trinitromethane, tricyanomethane, 1, 1-dicyanoethane, 1, 1-dinitroethane, triacetoxymethane, α-dinitroacetate lower alkyl esters, or α-nitropropionate lower alkyl esters.

8. The improvement as defined in claim 1, wherein the electron acceptor is tetracyanoethylene, tetracyanoquinodimethane, benzoquinone, dichlorodicyanobenzoquinone, tetrachlorobenzoquinone, tetrafluorobenzoquinone, tetracyanobenzoquinone, tetracyanobenzene, hexacyanobenzene, picric acid, picryl chloride, trinitrobenzoic acid, trinitrobenzoate lower alkyl esters, trinitroanisole, tri-nitrofluorenone, tetranitrofluorenone, tetranitrocarbazole, anthraquinone, or nitrobenzaldehyde.

9. The improvement as defined in claim 8, wherein the electron acceptor is tetracyanoethylene.

10. The improvement as defined in claim 1, wherein the equivalent ratio of the polyepoxides to the polyisocyanates is from 1.5 to 30 when the polyisocyanates are liquid at room temperature.

11. The improvement as defined in claim 8, wherein the equivalant ratio of the polyepoxides to the polyisocyanates is from 1.5 to 5 when the polyisocyanates are solid at room temperature.

12. A composition of matter stabilized at temperatures of about 60° C. or lower, but polymerizable and curable by heating in the presence of a curing catalyst, which comprises a polyepoxide having more than one epoxy group and polyisocyanate having more than one free isocyanate group, on the average, in the equivalent ratio of the poylepoxide to the polyisocyanate of from more than one to about 40, which is free of a basic curing catalyst for forming in the cured product oxazolidone rings and isocyanurate rings and further contains in an amount from $1 \times 10^{-5}$ to 1% by weight based on the total weight of the polyepoxide and polyisocyanate an electron acceptor selected from the group consisting of:
   (1) Compounds having an active methylene or methine group connected to an electron attractive group selected from the group consisting of —CN, —NO$_2$, —COOR, —COR and —CHO, where R is a lower alkyl group having one to 8 carbon atoms; and
   (2) Compounds of $\pi$-type electron acceptor.

13. A stabilized composition of matter as defined in claim 12, wherein the electron acceptor is cyanoacetic acid, cyanoacetate lower alkyl esters, α-cyanoacetamide, α-cyanoacetanilide, malononitrile, nitroacetic acid, nitroacetate lower alkyl esters, dinitromethane, nitracetone, formyl acetic acid, formyl acetate lower alkyl esters, formyl acetone, acetyl acetone, malonate lower alkyl diesters, or acetoacetate lower alkyl esters.

14. A stabilized composition of matter as defined in claim 12, wherein the electron acceptor is trinitromethane, tricyanomethane, 1, 1-dicyanoethane, 1, 1-dinitroethane, triacetoxymethane, α-dinitroacetate lower alkyl esters or α-nitropropionate lower alkyl esters.

15. A stabilized composition of matter as defined in claim 12, wherein the electron acceptor is tetracyanoethylene, tetracyanoquinodimethane, benzoquinone, dichlorodicyanobenzoquinone, tetrachlorobenzoquinone, tetrafluorobenzoquinone, tetracyanobenzoquinone, tricyanobenzoquinone, tetracyanobenzene, hexacyanobenzene, picric acid, picryl chloride, trinitrobenzoic acid, trinitrobenzoate lower alkyl esters, trinitroanisole, trinitrofluorenone, tetranitrofluorenone, tetranitrocarbazole, anthraquinone or nitrobenzaldehyde.

16. A stabilized composition of matter as defined in claim 12, wherein the amount of the electron acceptor is of $1 \times 10^{-4}$ to 0.1% by weight.

17. A stabilized composition of matter as defined in claim 12, wherein the electron acceptor is cyanoacetic acid.

18. A stabilized composition of matter as defined in claim 12, wherein the electron acceptor is malononitrile.

19. A method of curing the stabilized composition of matter as defined in claim 35, which comprises incorporating into the stabilized composition of matter a basic curing catalyst for forming oxazolidone rings and isocyanurate rings in an amount of 0.01 to 10% by weight based on the total weight of the polyepoxide and polyisocyanate; and heating the composition of matter at a temperature of about 80 to about 250° C. for about 1 to about 50 hours.

20. A method of curing the stabilized composition of matter as defined in claim 12, which comprises applying a basic catalyst for forming oxazolidone rings and isocyanurate rings in the cured product to a material to be impregnated, cast or molded, in an amount from 0.01 to 10% by weight based on the total weight of the polyepoxide and polyisocyanate; impregnating, casting or molding the material with the composition of matter as defined in claim 34; and heating the composition of matter at a temperature of about 80 to 250° C. for about 1 to 50 hours.

21. A stabilized composition of matter as defined in claim 12, wherein the polyisocyanate is a mixture of diphenylmethane diisocyanate and carbodiimide of diphenylmethane diisocyanate.

22. A stabilized composition of matter as defined in claim 12, wherein the electron acceptor is α-cyanoacetamide.

23. A stabilized composition of matter as defined in claim 12, wherein the electron acceptor is picryl chloride.

24. A stabilized composition of matter as defined in claim 12, wherein the electron acceptor is picric acid.

25. A stabilized composition of matter as defined in claim 12, wherein the electron acceptor is 2, 4, 6-trinitrobenzoate lower alkyl esters.

26. A stabilized composition of matter as defined in claim 12, wherein the electron acceptor is 2, 4, 6-trinitroanisole.

27. A stabilized composition of matter as defined in claim 12, wherein the electron acceptor is 2, 3-dichloro-5, 6-dicyanobenzoquinone.

28. A stabilized composition of matter as defined in claim 12, wherein the electron acceptor is 1, 3, 6, 8-tetranitrocarbozole.

* * * * *